US006607321B2

(12) United States Patent
Markham

(10) Patent No.: US 6,607,321 B2
(45) Date of Patent: Aug. 19, 2003

(54) METHOD AND APPARATUS FOR MOVING A MEDIUM THROUGH A MEDIUM INDEXING DEVICE

(75) Inventor: Roger Guy Markham, Webster, NY (US)

(73) Assignee: Xerox Corporation, Stamford, CT (US)

( * ) Notice: Subject to any disclaimer, the term of this patent is extended or adjusted under 35 U.S.C. 154(b) by 132 days.

(21) Appl. No.: 09/725,280

(22) Filed: Nov. 29, 2000

(65) Prior Publication Data

US 2002/0063544 A1 May 30, 2002

(51) Int. Cl.[7] .............................. H02P 7/00; H02P 8/14
(52) U.S. Cl. ....................... 400/582; 271/270; 318/430
(58) Field of Search ................................ 400/225, 611, 400/120.01, 124.05, 569, 545, 365, 568, 582; 347/104, 10, 14, 11, 19; 318/430, 432, 434; 271/8.1, 256, 264, 266, 270

(56) References Cited

U.S. PATENT DOCUMENTS 4,524,364 A * 6/1985 Bain et al. .................. 346/1.1
4,538,515 A * 9/1985 Tymkewicz et al. ........ 101/216
4,896,978 A * 1/1990 Shin .......................... 400/555
5,245,354 A * 9/1993 Ono et al. .................. 346/1.1
5,462,371 A * 10/1995 Beretta et al. ............. 400/659
5,963,006 A * 10/1999 Otani ......................... 318/696

* cited by examiner

*Primary Examiner*—Daniel J. Colilla
(74) *Attorney, Agent, or Firm*—Oliff & Berridge, PLC

(57) ABSTRACT

A method and an apparatus for a medium indexing device, such as an ink jet printer, that includes utilizing greater torque generated by a motor at lower speed and lower torque available by the motor at higher speeds. Motion profiling during acceleration and deceleration is designed to better utilize available torque provided by the motor in order to quickly position the medium during start-stop operations and to reduce the maximum power or speed required of the motor during the indexing operations. The motor may include a stepper or servo motor, and may apply to medium indexing devices other than printers. In addition, a velocity discontinuity in motor speed is provided near the stop position to prevent the medium from overshooting the intended stop position.

25 Claims, 2 Drawing Sheets

METHOD AND APPARATUS FOR MOVING A MEDIUM THROUGH A MEDIUM INDEXING DEVICE

BACKGROUND OF THE INVENTION

The present invention relates to a method and an apparatus for moving a medium, e.g. paper, through a printer or other device. More particularly, the present invention relates to providing a motion profile for aggressive/accurate medium indexing through a printer or other device requiring such medium indexing.

As demand for thermal ink jet printers ("TIJ printers"), for example, increases due to their flexibility and pricing, so too does the expectations of end users. A medium, e.g., paper, is passed through the printer at a constant rate, where a constant ramp in acceleration is used as a motion profile in order to stress indexing speed over smoothness of motion. However, this constant acceleration fails to take into consideration the availability of higher motor torque available at lower motor speeds and demands as much torque at high speeds, which often places demands on the motor torque and power that cannot be met. Other traditional motion profiles favor smoothness of motion, i.e., less acceleration at both low and high speeds, but these motion profiles undesirably result in a longer indexing time, which lowers the operational speed of a printer device.

As TIJ carriage printers begin to use higher carriage speeds and larger heads, it becomes imperative to use a more aggressive method to advance or index the medium between lateral print head passes across the medium. Less time is available during traditional carriage acceleration and deceleration, and the medium must be moved farther. Traditionally, the medium is advanced by a stepper motor driving a gear train to drive wheels or rollers engaged with the back side of paper. Stepper motors have proven to be ideal choices for low cost indexing mechanisms.

However, for an medium indexing system contemplated by this invention, it was required to advance paper, for example, a distance of 1.57 inches in approximately 0.15 seconds. This amounted to an average speed of 10 inches per second with a much higher peak speed near the middle of the indexing intervals. Although stepper motors may be used, the present invention preferably uses a servo motor. Stepper motors, especially those typically used in less expensive TIJ printers, may not be capable of reaching the desired, intermittent indexing speeds.

Initial testing showed that it was necessary to run the servo motor at maximum speeds in order to attain favorable torque stiffness at the drive wheel to generate accurate indexing. Gearing is selected to "wind" the motor out when at peak speed. Thus, if a motion profile, i.e., velocity-versus-time or acceleration-versus-time profile, could minimize the peak motor speed, it would optimize the indexing by allowing a more favorable gearing.

Both servo motors and stepper motors demonstrate greatly diminished torque at higher rotation speeds, assuming a constant drive level. When either type of motor is driven at high speeds, the servo controller (using an encoder feedback) demanded very large currents from its power supply. This creates an undesirable and potentially severe power supply cost problem.

Traditionally, a constant acceleration ramp for the motion profile is used, especially when desiring to stress indexing speed over smoothness of motion. However, this profile fails to take into consideration the relatively higher availability of torque at low motor speeds and the lack thereof at high speeds. This causes a problem with the motor's power supply.

SUMMARY OF THE INVENTION

The present invention overcomes the above and other problems by providing a method of and an apparatus for driving a medium indexing motor in a certain manner in order to utilize relatively greater available motor torque at low motor speeds during both acceleration and deceleration, and to use less torque at high motor speeds. Such a driving profile has the advantage of reducing the peak motor speed necessary to advance the medium the required distance in the minimum amount of time.

It has also been found that the motion profile is optimized by the addition of a discontinuity in the velocity of the medium driven by the motor. The addition of the discontinuity to velocity prevents the medium from overshooting its targeted stop location.

A method according to the present invention includes driving a motor of a printer or other medium indexing device at such speeds as to make optimum use of the torque generated at relatively lower motor speeds and make less use of torque at relatively higher motor speeds. Moreover, such a method may further include adding a discontinuity to the velocity profile to prevent the substrate being fed through the printer from overshooting its desired stop position.

BRIEF DESCRIPTION OF THE DRAWINGS

These and other features, characteristics and methods of operation of the present invention will become more apparent to one having skill in the art from a study of the following illustrative embodiments in conjunction with the appended drawings, all of which form a part of this specification.

DESCRIPTION OF ILLUSTRATIVE EMBODIMENTS

As previously mentioned, a discontinuity in the velocity at which the motor and, in turn, the rollers and gears are driven, will optimize the usage of the motor torque. A discontinuous velocity jump (of considerable magnitude) at the start and end of the programmed medium movement provides optimum results, although smaller discontinuities may be used. Because of the finite bandwidth of the controller, the discontinuity does not result in a singular response, but a maximal one. The purpose of the discontinuity jump is more than simply boosting the low speed acceleration. It is intended to extend the bandwidth of the controller only during the critical stopping period. A typical servo system takes the difference between the commanded location and the present location, amplifies this difference, and applies a proportional power to the motor to reduce the positional difference. Slightly more advanced controllers also look at the first derivative of this error signal, amplify the derivative signal, and apply additional power in response to the derivative (i.e., the velocity). This effectively extends the bandwidth of the control system because higher frequencies in the position error signal have higher gain feedback. There is a limit, however, to how much derivative gain can be applied. Too much derivative gain causes instability of the system.

The stratagem here is to put a deliberate high frequency component into the feedback by commanding a discontinuity in the velocity. The high gain at the higher frequencies ensures maximum breaking torque at the very end of the motion.

It was found during testing that paper invariably overshot the target stopping location and was driven back by the servo control system. No amount of adjustment of the proportional or derivative gain could produce critically dampened positional response, i.e., no overshoot. By adding a velocity jump of, for example, 10% of the peak speed, with maximal but still stable proportional and differential gain, the overshoot was made trivial. This reduced settling time and allowed printing very shortly after the medium first reached the intended stop point. Additionally, the combination of the high gains and favorable gearing produced a stiff system that indexed accurately. The extent of velocity jump to achieve such beneficial results may vary widely for a little as 2%, or less, to perhaps as much as 25%, or more.

Figure 1:
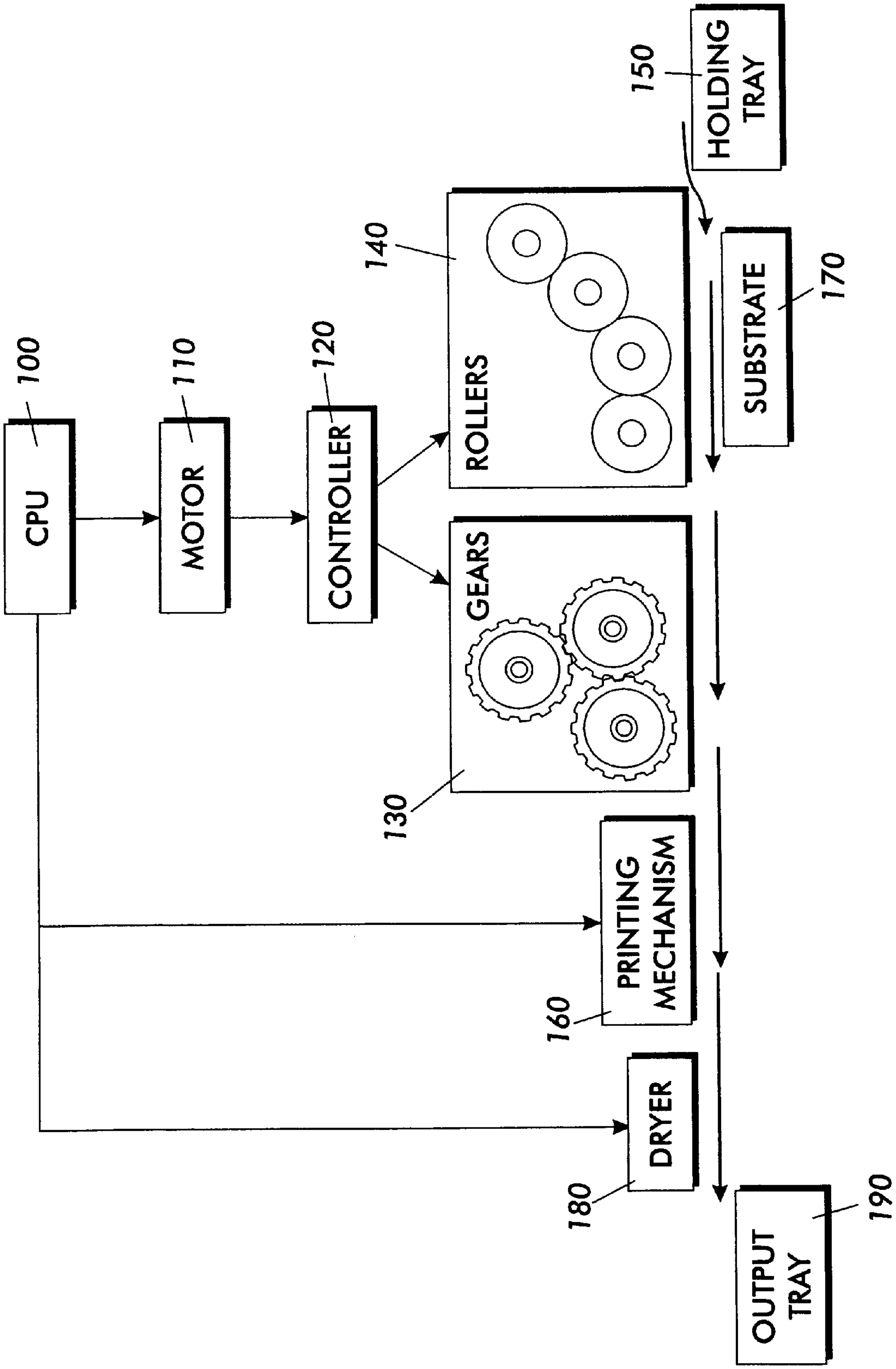
FIG. 1 is a block diagram of the ink jet printer that may include features of the present invention.

In FIG. 1, a control mechanism for a medium indexing device, such as a printer, depicts a CPU 100 that operates controller 110 which, in turn, operates a medium indexing motor 120. Motor 120 controls the rotational speed of the gears 130 and rollers 140. The rollers feed a medium or substrate 170 from a holding tray 150 to a print mechanism 160 and dryer 180, both of which are also controlled by the CPU 100 and onward to the output tray 190, where the printed substrates collect.

Figure 2:
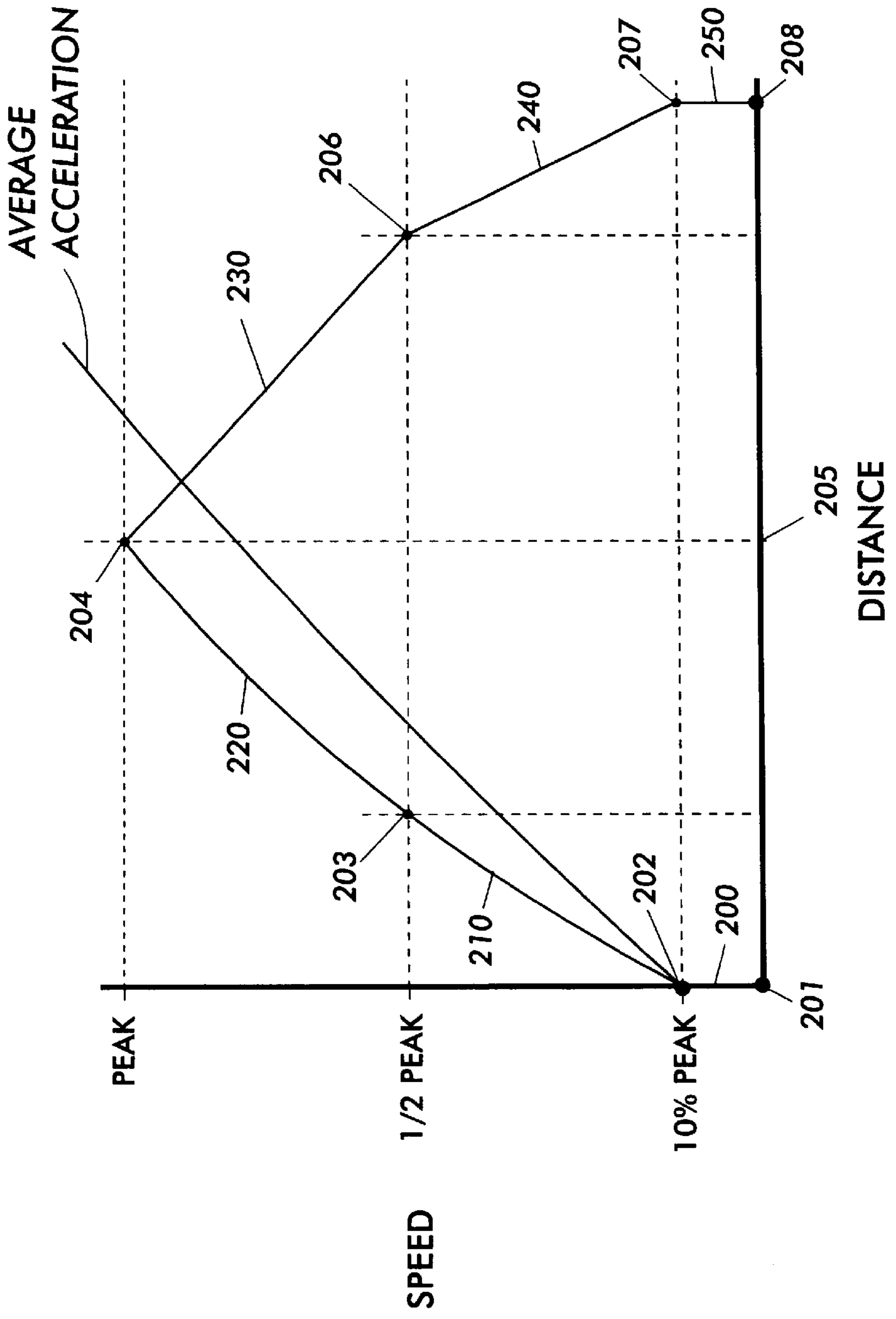
FIG. 2 is a graph showing an exemplary velocity profile that may be used according to the present invention.

A desired velocity profile is programmed into CPU 100 is shown in FIG. 2. By way of example, the velocity profile provides an immediate jump 200 in peak speed from point 201 to 202 on the illustrated velocity chart (a 10% jump is illustrated), an acceleration 210 between points 202 and 203 at about twice the average rate until reaching half peak speed, a reduced acceleration period 220 between points 203 and 204 until reaching a given distance (e.g., about half distance 205 is illustrated) and peak speed is reached, a reduced deceleration period 230 from points 204 to 206 to about half peak speed, a faster deceleration period 240 between points 206 to 207 at about twice the average rate until reaching the intended stopping point is reached at 10% peak speed. Finally, a command zero speed-hold position 250 is reached at point 208.

As indicated herein, the motion-distance-velocity-acceleration profile illustrated and described may vary widely. A general goal in determining a profile to attain the benefit of the invention includes providing a discontinuity in velocity, reducing maximum peak speed during the indexing interval, and minimizing motor torque demand at high speeds. This may be achieved by providing a profile stored in a memory that is accessed by a processor, which effects control of the motor based on memory contents.

Again by way of illustration, the immediate jump 200 and/or deceleration jump 250 may range from as little as 2% or less to as much as 25% or more, the ratio of acceleration between legs 210 and 220 may vary by a factor of 1.25 to 3.0 (the same applies to the acceleration between legs 230 and 240), and the speed reached at points 203 and 206 may range between 0.25 to 0.75 of peak speed. In addition, the motion profile may include fewer or greater than three legs during acceleration sub-profile and three legs during deceleration sub-profile. The invention contemplates a profile having at least two legs during each of the acceleration and deceleration sub-profiles. In addition, the sub-profiles need not be symmetrical during acceleration and deceleration. Asymmetrical sub-profiles by also be used. Further, the profiles need not be linear, as shown, but may be provided in any complex form easily made possible by digital profiling, e.g., using pre-stored data in a ROM and accessing that data by a processor which, in turn, effects positioning control of a servo motor.

Note that the above process is illustrated in terms of a commanded position/velocity. The actual position/velocity will differ considerably according to physical parameters of the mechanical system. However, this type of motion is easier for the system to follow because it takes into account the low speed torque capability and lack thereof at high speeds. Using a profile comparable to that shown in FIG. 2 enables the motor current to be cut by a factor of three or more, the peak speed is down by about 60%, and the positioning accuracy of a substrate in a medium indexing device, e.g., an ink jet printer, is improved by a factor of two or more. All this is accomplished in the required time.

While this invention has been particularly shown and described with reference to a preferred embodiment thereof, it will be understood by those skilled in the art that various changes in form and details may be made therein without departing from the spirit and scope of the invention as defined by the appended claims.

What is claimed is:

1. A method for operating an electric motor of a medium indexing mechanism requiring start-stop motion of a medium, the method comprising:

accelerating the motor at an above average acceleration rate until motor speed reaches at least one-quarter peak speed to maximize torque usage at lower motor speeds;

subsequently reducing acceleration of the motor until said peak speed is reached to lessen torque requirements and motor current demand at higher motor speeds;

decelerating the motor at a below average rate from the peak speed to at least three quarter peak speed;

subsequently decelerating the motor at an above average deceleration rate until reaching near an intended stopping position; and commanding a zero speed-hold position in which the motor stops at the intended stopping position.

2. The method according to claim 1, wherein the mechanism is part of a printer.

3. The method according to claim 2, wherein said medium is a printable substrate and the method achieves positioning of the substrate within said printer.

4. A method according to claim 3, wherein said substrate is a piece of paper.

5. A method according to claim 1, further including immediately driving the motor at 2–25% of peak speed to produce a velocity discontinuity during initial movement.

6. The method of claim 1, further including providing a motor drive profile that commands the driving of the motor.

7. The method of claim 6, wherein the profile includes at least two deflection points during acceleration and at least two deflection points during deceleration.

8. The method of claim 6, wherein the profile is non-linear.

9. The method of claim 6, wherein the profile is asymmetric for sub-profiles during acceleration and deceleration.

10. The method according to claim 1, wherein the above average acceleration continues until about one-half peak speed is reached.

11. The method according to claim 1, wherein the motor is a servo motor.

12. A method of positioning a piece of paper along a transport path of a printer, said method comprising:

placing said sheet of paper at an entrance to said printer;

driving a motor of said printer by accelerating the motor at an above average acceleration rate until motor speed reaches at least one-quarter peak speed to maximize torque usage at lower motor speeds;

subsequently reducing acceleration of the motor until said peak speed is reached to lessen torque requirements and motor current demand at higher motor speeds;

decelerating the motor at a below average rate from the peak speed to at least three-quarter peak speed;

subsequently decelerating the motor at an above average deceleration rate until reaching near an intended stopping position; and commanding a zero speed-hold position in which the motor stops and positions said paper at an optimum position for printing.

13. A method according to claim 12, further including initially driving the motor at 2–25% of peak speed to provide a velocity discontinuity.

14. The method according to claim 12, wherein the above average acceleration continues until about one-half peak speed is reached.

15. The method according to claim 12, wherein the motor is a servo motor.

16. An apparatus for controlling positioning of a medium in a medium indexing device, said apparatus comprising:

a plurality of gears and rollers operably provided to engage and index a medium;

a motor for driving said gears and rollers; and a processor adapted to control said motor so as to utilize more motor torque at lower motor speeds and less torque at higher motor speeds by:

accelerating the motor at an above average acceleration rate until motor speed reaches at least one-quarter peak speed to maximize torque usage at lower motor speeds;

subsequently reducing acceleration of the motor until said peak speed is reached to lessen torque requirements and motor current demand at higher motor speeds;

decelerating the motor at a below average rate from the peak speed to at least three-quarter peak speed;

subsequently decelerating the motor at an above average deceleration rate until reaching near an intended stopping position; and commanding a zero speed-hold position in which the motor stops at the intended stopping position.

17. The apparatus according to claim 16, wherein said medium indexing device is a thermal ink jet printer.

18. The apparatus according to claim 17, wherein said medium is a piece of paper.

19. The apparatus according to claim 18, wherein said gears and rollers serve to position said paper at a start position of said printer.

20. The apparatus as recited in claim 16, further including a stored profile used by said processor to effect control of said motor, said stored profile including at least two motor control deflection points for each of acceleration and deceleration legs.

21. The apparatus as recited in claim 16, further including a stored profile used by said processor to effect control of said motor, said stored profile including a digital profile that effects control of the motor during acceleration and a digital profile that effects control of the motor during deceleration.

22. The apparatus according to claim 16, wherein the processor controls the motor to accelerate at the above average rate until about one-half peak speed is reached.

23. The apparatus according to claim 16, wherein the motor is a servo motor.

24. The apparatus according to claim 16, wherein the motor drives the rollers and gears to advance the medium at an average speed of at least 10 inches per second.

25. The apparatus according to claim 16, wherein the processor controls the motor speed to immediately run the motor between 2–25% of peak speed to create a velocity discontinuity.

* * * * *